UNITED STATES PATENT OFFICE.

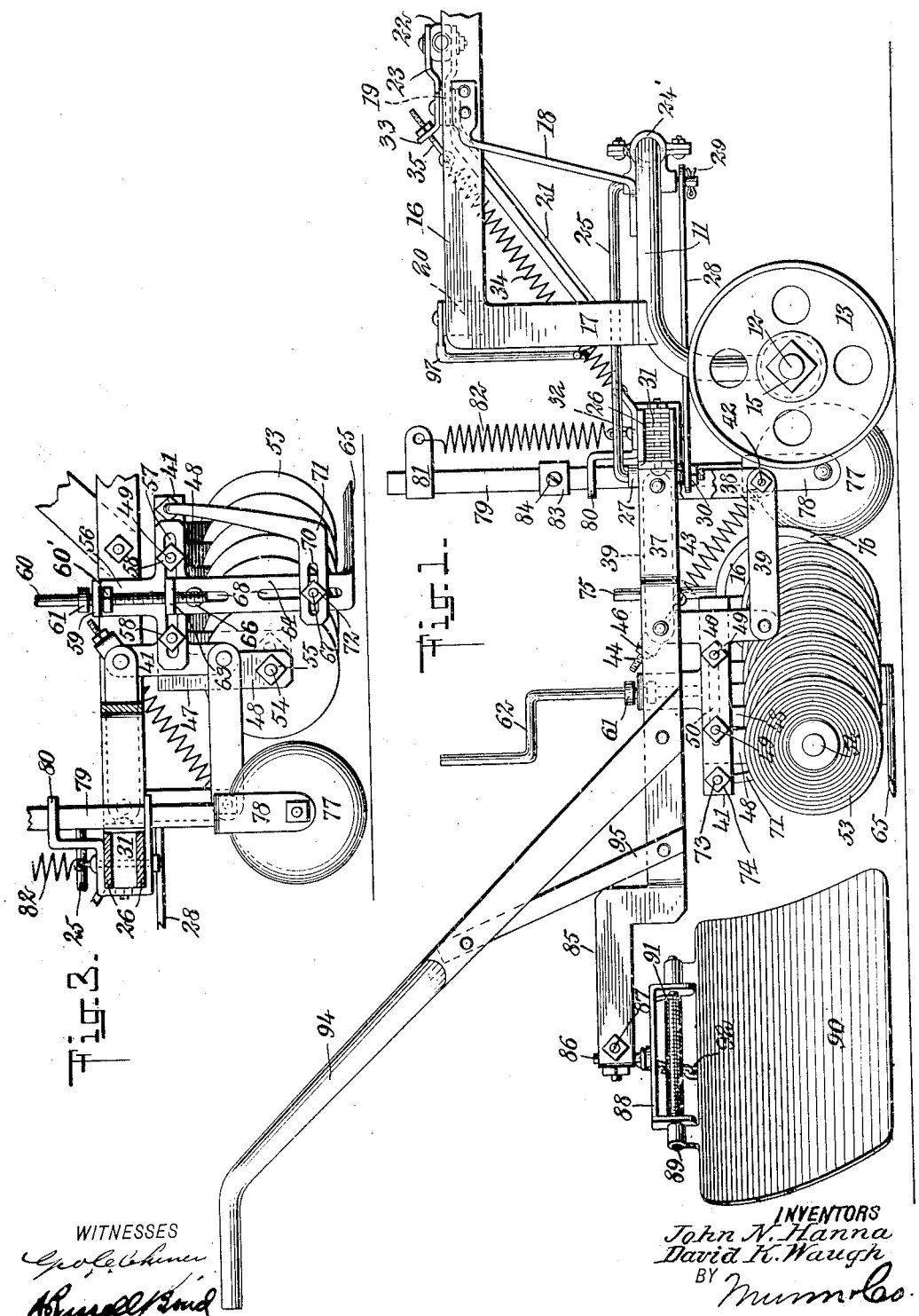

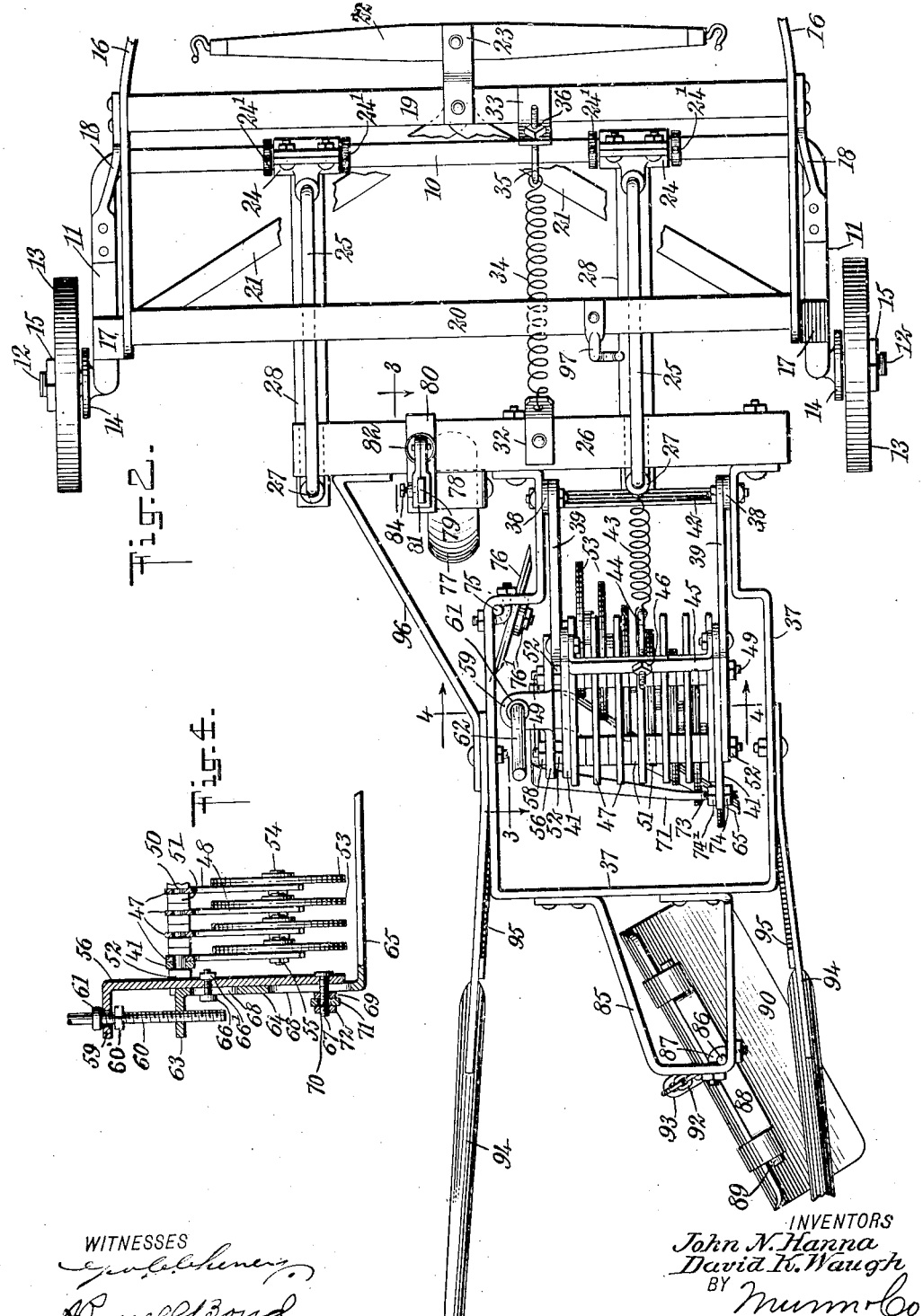

JOHN N. HANNA AND DAVID K. WAUGH, OF ORDWAY, COLORADO.

BEET-TOPPING MACHINE.

No. 882,465.  Specification of Letters Patent.  Patented March 17, 1908.

Application filed May 16, 1907. Serial No. 373,954.

*To all whom it may concern:*

Be it known that we, JOHN N. HANNA and DAVID K. WAUGH, citizens of the United States, and residents of Ordway, in the county of Otero and State of Colorado, have invented a new and Improved Beet-Topping Machine, of which the following is a full, clear, and exact description.

An object of the invention is to provide an improved machine adapted to cut off the tops of sugar beets or any other root crop before removing the root portions from the ground.

Another object is to provide means for clearing the tops to one side after they have been cut off.

The invention consists in the construction and combination of parts to be more fully described hereinafter and particularly set forth in the claims.

Reference is to be had to the accompanying drawings forming a part of this specification, in which similar characters of reference indicate corresponding parts in all the views.

Figure 1 is a side view of our improved machine; Fig. 2 is a plan view of the machine; Fig. 3 is a sectional view of a part of the machine taken on the line 3—3 of Fig. 2 and viewed in the direction of the arrows; and Fig. 4 shows a cross section of a part of the machine taken on line 4—4 of Fig. 2 and viewed in the direction of the arrows.

Briefly stated our machine comprises a truck, a topping mechanism linked at its forward end to the truck, and a device mounted at the rear of the topping mechanism for clearing aside the tops cut off by the topping mechanism. The truck frame is formed with a U-shaped member comprising a front section 10, and two rearwardly-extending side sections 11, the latter being bent downward and terminating in outwardly-extending stub axles 12. A wheel 13 is mounted on each axle and is held thereon between an annular flange 14 formed on the axle, and a nut 15 threaded on to the end of the axle. A pair of thills 16 are formed at their rear end with downwardly-projecting extensions 17 which are secured to the side sections 11 of the U-shaped frame. The thills are also braced by a pair of arms 18 secured thereto and to the side sections 11. A pair of cross bars 19 and 20 connect the two thills. A pair of brace bars 21 running diagonally from the lower ends of the extensions 17 to the center of the cross bars 19 serve as additional supports for the thills. A swingletree 22 is pivoted in a yoke 23 secured to the cross bar 19.

Journaled on the section 10 of the U-shaped frame at a suitable distance apart are a pair of brackets 24. Each bracket is confined between a pair of collars 24'. An opening is formed in each bracket 24 and projecting through the opening is the downwardly-bent end of a link 25. The links extend rearwardly over a cross beam 26 and at the rear are bent downward to pass respectively through apertured brackets 27 secured to the beam 26. A connecting plate 28 passes beneath each pair of opposite brackets 24 and 27 and is formed with apertures adapted to receive the ends of the respective links 25 engaging said brackets. At their forward ends these plates 28 rest on pins 29 which pass transversely through the links 25 while the rear ends of the plates 28 are supported on nuts 30 threaded on to the ends of the links 25. The cross beam 26 is formed of two plates spaced apart by means of blocks 31. Secured to the cross beam intermediate of the links 25 is an ear 32 with an upturned end in which a transverse aperture is formed. A similar apertured ear 33 is secured to the cross bar 19 directly opposite the ear 32. A tension spring 34 is hooked at one end through the aperture of the ear 32 and at the other end through the eye of an eye-bolt 35 which passes through the aperture in the ear 33. A nut 36 threaded on the bolt 35 bears against the ear 33 and may be turned to tighten or ease the tension of the spring, as may be desired.

It will be observed that owing to the double link connection of the cross bar 26 with the section 10 the cross bar may be swung like a parallel ruler toward and from the frame 10, and will always lie parallel therewith. The spring 34 resists lateral movement of the cross bar, and hence serves to hold the cross bar at its maximum distance from the section 10. It also tends to support the weight of said bar.

Rigidly secured to the cross beam 26 and extending rearwardly therefrom is an approximately rectangular frame 37 and rigidly secured to said frame, respectively at opposite sides thereof, are a pair of downwardly-projecting cross-heads 38. Two pairs of links 39 serve respectively to connect the ends of the cross-heads 38 with the ends of the heads 40 of a pair of T-shaped members 41. A cross brace 42 connects the lower ends of the cross-heads 38. A tension spring 43 is hooked at one end through an aperture in the cross brace 42 and its opposite end is hooked through the eye of an eye-bolt 44. The latter passes through an aperture in a cross-brace 45 which connects the upper ends of the heads 40, while a nut 46 threaded on the said bolt and bearing against the cross brace 45 provides means for adjusting the tension of the spring 43. The spring, owing to its inclined position, serves to draw the T-shaped members 41 downwards and the latter, owing to their double-link connection with the cross-heads 38 maintain a parallel relation to these cross-heads no matter in what position they are moved.

Between the two T-shaped members 41 are a series of hangers, each comprising a head 47 with a depending arm 48. The hangers 47 are supported on a pair of bolts 49 secured at opposite ends to the members 41 and these bolts pass through slots 50 formed in the heads 47. Collars 51 on the bolts serve to space the hangers apart and nuts 52 on the ends of the bolts provide means for clamping the hangers securely between the members 41. The hangers are not all of exactly the same shape, but the arms 48 depend from different points on the heads, which points are so chosen that when the hangers are assembled on the bolts 49 the arms will lie in a successively-stepped arrangement forming a row extending from front to rear of the assembled group of hangers, as shown in Figs. 1 and 3. It will be evident that the hangers need not be each of a different pattern, but that certain of them may be made in duplicate and the members of each pair of duplicates assembled in mutually reverse position at opposite sides of the center of the group. The slots 50 are long enough to permit of adjusting the hangers to vary the angle formed by the row of arms 48 with the members 41. Each arm 48 carries a disk 53 which is journaled on the shank of a screw 54 threaded through an opening in said arm. Each screw is locked in place by means of a jam nut 55.

Adjacent to one of the members 41 is a cruciform member 56 provided with laterally-extending slots 57 through which the bolts 49 project. The member 56 is clamped on these bolts against the adjacent nut 52 by means of nuts 58. The cruciform member is formed with an overhanging lip 59 in which an aperture is provided. Projecting freely through this aperture is a rod 60 on which is firmly secured a collar 61 adapted to bear against the upper face of the lip. The upper portion of the rod is bent to form a crank 62 and the lower portion of the rod is threaded to engage a correspondingly threaded aperture in an overhanging lip 63 formed on the upper end of a shank 64 which, at its lower end, carries a knife blade 65. The knife blade extends approximately at right angles to the shank and is inclined toward the rear of the machine. The shank 64 is clamped to the member 56 by means of bolts 66 and 67 threaded into said member which pass through vertical slots 68 in the shank. A jam nut 66' on the bolt 66 bears against the member 56 and serves to hold the bolt 66 at the desired adjustment. The bolt 67 which is riveted on the inner side of member 56 also passes through a slot 70 in a brace 71 and engaging nuts 69 and 72 on opposite sides of said brace. The brace 71 extends upward to the opposite member 41 and is formed with a threaded end 73 which passes through an aperture in said member. Nuts 74 and 74' on said threaded end 73 may be screwed respectively against opposite sides of said member 41 to lock the brace 71 at any desired adjustment in said member. The slots 57 and 70 allow of lateral adjustment of the knife 65, while the vertical slots 68 allow for vertical adjustment of the knife, this latter adjustment being effected, when the nuts 66' and 69 are loosened, by turning the crank 62 to feed the rod 60 into or out of the lip 63. A jam nut 60' on the rod 60 may be screwed down against the lip 63 to assist in holding the knife at the desired adjustment.

Secured to the frame 37 in advance of and at the side adjacent to the knife shank 64 is a depending rod 75, which at its lower end is bent at a right angle to form an axle for a disk 76. The latter is held on the axle by means of a nut 76'. As shown in the plan view, Fig. 2, the axle 75 does not lie parallel with the main axles 12 of the machine, but inclines toward the rear so that the disk 76 lies at an acute angle with the disks 53.

Adjacent to the disk 76 and approximately midway between the wheels 13 is a guide wheel 77 which is journaled in a yoke 78. The latter is formed with an angular shank 79 which passes through angular openings in the guide frame 80 secured to the cross beam 26. A clip 81 fastened to the upper end of the shank overhangs the beam 26. A spring 82 connected to the clip 81 and the beam 26 exerts a downward tension on the shank 79. A stop collar 83 may be fastened by means of a set screw 84 at any desired position on said shank.

Secured to the frame 37 at the rear thereof is a secondary frame 85 to which a stud 86 is secured by means of the angle bolt 87. Formed on the stud 86 is a yoke frame 88 in which a shaft 89 is journaled. Mounted on this shaft is a scoop or shovel blade 90. A spring 91 coiled on the shaft 89 bears at one end against the yoke 88 and at the other against the blade 90, tending to swing the blade 90 forward. A chain 92 attached at one end to the stud 86 and at the other to a lug 93 formed on the blade, serves as a stop to limit the forward swing of the blade. The blade 90 is mounted at an angle with the direction in which the machine is adapted to travel.

To assist in guiding the topping mechanism when the machine is in operation, a pair of handles 94 are secured to the frame 37 at opposite sides thereof. These handles are braced by means of braces 95. The frame 37 is also braced by means of a bar 96 which connects said frame with the beam 26.

In practice the tread of the truck is made wide enough to span two rows of the crop, so that the horse which draws the machine can walk between the rows. The topping mechanism is coupled to one side of the truck and operates over one of the rows, being guided thereon by means of the wheel 77 which travels between the rows. Owing to the double-link connection of the topping mechanism with the truck the operator can readily swing said mechanism laterally, as may be desired, without disturbing the parallel relation of said mechanism with said truck.

In operation the disks 53 serve to keep the knife blade 65 at the requisite level above the row to cut the tops without injuring the roots; for as the disks ride over the crop the frame members 41 which carry the knife will rise and fall with them. The double link connection of these frame members with the frame 37 causes the members 41 to move forward when they are lifted and, when the disks ride off a high beet on to a low one the knife will be moved backward as well as downward, and hence there will be no danger of a failure to top the low beet. The disk 76 which is sharpened, serves to cut off any foliage which may lie in the path of the knife-shank to prevent such foliage from becoming entangled with said shank. The angular position of the disk 76 helps to counteract the one-sided drag of the topping mechanism on the truck. The stepped position of the disks 53 and the rearward inclination of the knife, tend to push the tops to one side, after which the blade 90 clears the tops into the trough at the side of the row, laying bare the top of the row. The blade 90 will yield if it strikes any obstruction and swing clear of the obstruction, after which the spring 91 will return the blade to its normal position. A hook 97 is secured to the cross bar 20, and when it is desired to hold the topping mechanism out of operative engagement with the ground, the frame 37 is lifted and one of the links 25 is seated in said hook 97.

Having thus described our invention, we claim as new and desire to secure by Letters Patent:—

1. In a beet topping machine a wheeled truck, a beet topping mechanism, and a double parallel motion connecting said mechanism and said truck and permitting said mechanism to be moved laterally and in a vertical plane.

2. In a beet topping machine a truck mounted on wheels, a frame normally occupying a position intermediate of said wheels but adjacent to one of said wheels, a beet topping mechanism mounted in said frame, a parallel motion connecting said frame with said truck and permitting said frame to be swung laterally, and a spring serving to hold said frame in said normal position.

3. In a beet topping machine a wheel-supported truck, a frame connected to said truck and adapted to move laterally but in parallel relation with said truck, and a beet topping mechanism mounted in said frame and adapted to move vertically but in parallel relation with said frame.

4. In a beet topping machine a wheel-supported main frame, a secondary frame mounted in said main frame and adapted to move vertically but in parallel relation with said main frame, a series of parallel disks supporting said secondary frame and mounted to rotate in the direction in which said machine is adapted to travel, and a transverse knife supported on said secondary frame at the rear of said disks.

5. In a beet topping machine a wheel-supported main frame, a secondary frame mounted to swing vertically but in parallel relation with said main frame, a series of hangers carried by said secondary frame, a disk carried by each of said hangers and adapted to rotate in the direction in which said machine is adapted to travel, said disks being positioned successively one in advance of another, and a knife supported on said secondary frame to the rear of and approximately parallel with said disks.

6. In a beet topping machine a wheel-supported main frame, a secondary frame mounted to swing vertically but in parallel relation with said main frame, a series of hangers carried by said secondary frame, a disk carried by each of said hangers and adapted to rotate in the direction in which said machine is adapted to travel, said disks being positioned successively one in advance of another, a knife supported on said secondary frame to the rear of and approximately parallel with said disks, and means for adjusting said knife vertically and horizontally.

7. In a beet topping machine a wheel-supported truck, a frame adjustable laterally and vertically in parallel relation with said truck, a series of hangers each consisting of a head and a depending arm, said arms depending successively one in advance of another in said series, a pair of bolts transversely mounted in said frame, said heads being formed with slots, said bolts being inserted through said slots, collars on said bolts serving to space said hangers apart, and a disk carried by each arm and journaled to rotate in the plane of said arm.

8. In a beet topping machine a truck mounted on wheels, a frame, a parallel motion connecting said frame with said truck and permitting said frame to be moved laterally with respect to said truck, said frame normally occupying a position intermediate of said wheels, but adjacent to one of said wheels, a guide wheel connected with said frame and normally occupying a position midway between said wheels, and a beet topping mechanism mounted in said frame.

9. In a beet topping machine a truck mounted on wheels, a frame, a parallel motion connecting said frame with said truck and permitting said frame to be moved laterally with respect to said truck, said frame normally occupying a position intermediate of said wheels, but adjacent to one of said wheels, a beet topping mechanism mounted in said frame, a bar mounted to slide vertically in said frame, a guide wheel journaled at the lower end of said bar, and a spring adapted to exert a downward tension on said guide wheel.

10. In a beet topping machine a truck mounted on wheels, a frame, a parallel motion connecting said frame with said truck and permitting said frame to be moved laterally with respect to said truck, said frame normally occupying a position intermediate of said wheels, but adjacent to one of said wheels, a beet topping mechanism mounted in said frame, a bar mounted to slide vertically in said frame, a guide wheel journaled at the lower end of said bar, a spring adapted to exert a downward tension on said guide wheel, and handles secured to said frame.

11. In a beet topping machine a wheel-supported truck, a frame coupled to said truck, a knife comprising a shank secured to said frame and a blade extending transversely below said frame, and a cutting disk mounted on said frame in advance of said shank.

12. In a beet topping machine a wheel-supported truck, a main frame coupled to said truck intermediate of the wheels thereof and adjacent to one of said wheels, a secondary frame, a series of revoluble disks supporting said secondary frame, a knife comprising a shank secured to said secondary frame, and a blade extending transversely below said secondary frame, and a guard disk mounted on said main frame in advance of said shank and at such an angle with the direction in which the machine is adapted to travel as to counterbalance the one-sided drag of said series of disks on said truck.

13. In a beet topping machine a wheel-supported truck, a beet topping mechanism coupled to said truck, a scoop mounted at the rear of said mechanism at an angle with respect to the direction in which said mechanism is adapted to travel, and means for holding said scoop yieldingly at a predetermined working angle.

14. In a beet topping machine a wheel-supported truck, a frame coupled to said truck and movable laterally with respect to said truck, a beet topping mechanism supported in said frame, a shaft mounted in said frame at the rear of said beet topping mechanism and at an angle to the direction in which said machine is adapted to travel, a scoop journaled on and depending from said shaft, a spring exerting a forward tension on said scoop, and means for limiting the forward swing of said scoop.

15. In a beet topping machine a wheel-supported truck, a main frame movable laterally thereon, a secondary frame, a series of revoluble disks supporting said frame at the rear of said disks, parallel links connecting said secondary frame with said main frame and permitting said secondary frame to move in a vertical plane, and a spring exerting a downward tension on said disks.

16. In a beet topping machine a wheeled truck, a main frame movable laterally thereon, a secondary frame, a series of revoluble disks supporting said secondary frame, a knife extending transversely below said secondary frame at the rear of said disks, and a parallel motion coupling said secondary frame to said main frame and permitting said secondary frame to move in a vertical plane, said parallel motion also producing a forward motion of said secondary frame when said secondary frame is raised and a rearward motion of said secondary frame when said secondary frame is lowered.

17. In a beet topping machine a wheel-supported truck, brackets journaled on said truck, a frame, a parallel motion coupling said frame with said brackets and permitting lateral adjustment of said frame, a beet topping mechanism mounted in said frame and normally occupying an operative position in engagement with the ground, and a hook adapted to hold said mechanism out of said operative position.

In testimony whereof we have signed our names to this specification in the presence of two subscribing witnesses.

JOHN N. HANNA.
DAVID K. WAUGH.

Witnesses:
WM. C. KROPF,
JAMES E. DOWNEY.